United States Patent [19]

Leighton

[11] 4,130,027
[45] Dec. 19, 1978

[54] RESILIENT LEVER ASSEMBLY

[75] Inventor: John D. Leighton, Bloomfield Hills, Mich.

[73] Assignee: Betty Leighton, Bloomfield Hills, Mich. ; a part interest

[21] Appl. No.: 761,647

[22] Filed: Jan. 24, 1977

Related U.S. Application Data

[63] Continuation-in-part of Ser. No. 693,104, Jun. 4, 1976, abandoned.

[51] Int. Cl.² ............................................. G05G 1/14
[52] U.S. Cl. ..................................... 74/512; 248/374;
267/57.1 A; 267/63 A; 267/153; 267/154
[58] Field of Search ........................... 248/374, 358 R; 267/63 A, 63 R, 57.1 A, 57.1 R, 153, 154; 74/512

[56] References Cited

U.S. PATENT DOCUMENTS

| 1,633,580 | 6/1927 | Froesch | 267/57.1 R |
| 2,087,254 | 7/1937 | Herold | 267/57.1 R |
| 2,715,022 | 8/1955 | Krotz | 267/57.1 R |
| 3,572,677 | 3/1971 | Damon | 267/57.1 R |
| 3,584,857 | 6/1971 | Hipsher | 267/57.1 R |
| 3,674,131 | 7/1972 | Matson | 267/57.1 A X |
| 3,693,963 | 9/1972 | Leighton | 267/54 A |

FOREIGN PATENT DOCUMENTS

| 1802474 | 5/1969 | Fed. Rep. of Germany | 248/374 |
| 447227 | 4/1949 | Italy | 248/374 |
| 486837 | 6/1939 | United Kingdom | 267/57.1 A |

Primary Examiner—George E. A. Halvosa
Attorney, Agent, or Firm—Harness, Dickey & Pierce

[57] ABSTRACT

A resilient lever assembly which incorporates spring action whereby the resilient portion of the assembly constantly urges a rigid lever against a lever movement resistance member connected to the lever. The action is accomplished by securing the resilient support to a fixed member in a rotational position such that the resilient support is stressed in the proper direction. In one form, the resilient support and its securing components comprises a rubber bushing between two sleeves, one fixed to the lever and the other to the fixed member. In another version of the invention, the resilient support is in the form of an extension of the lever having spring-like properties and secured at its outer end to the fixed member. The lever movement resistance member may be in the form of a stop adjacent the rigid lever. In another version, the lever movement resistance member could comprise the valving of a vehicle brake booster against which the lever is urged.

6 Claims, 12 Drawing Figures

U.S. Patent  Dec. 19, 1978  Sheet 1 of 2  4,130,027
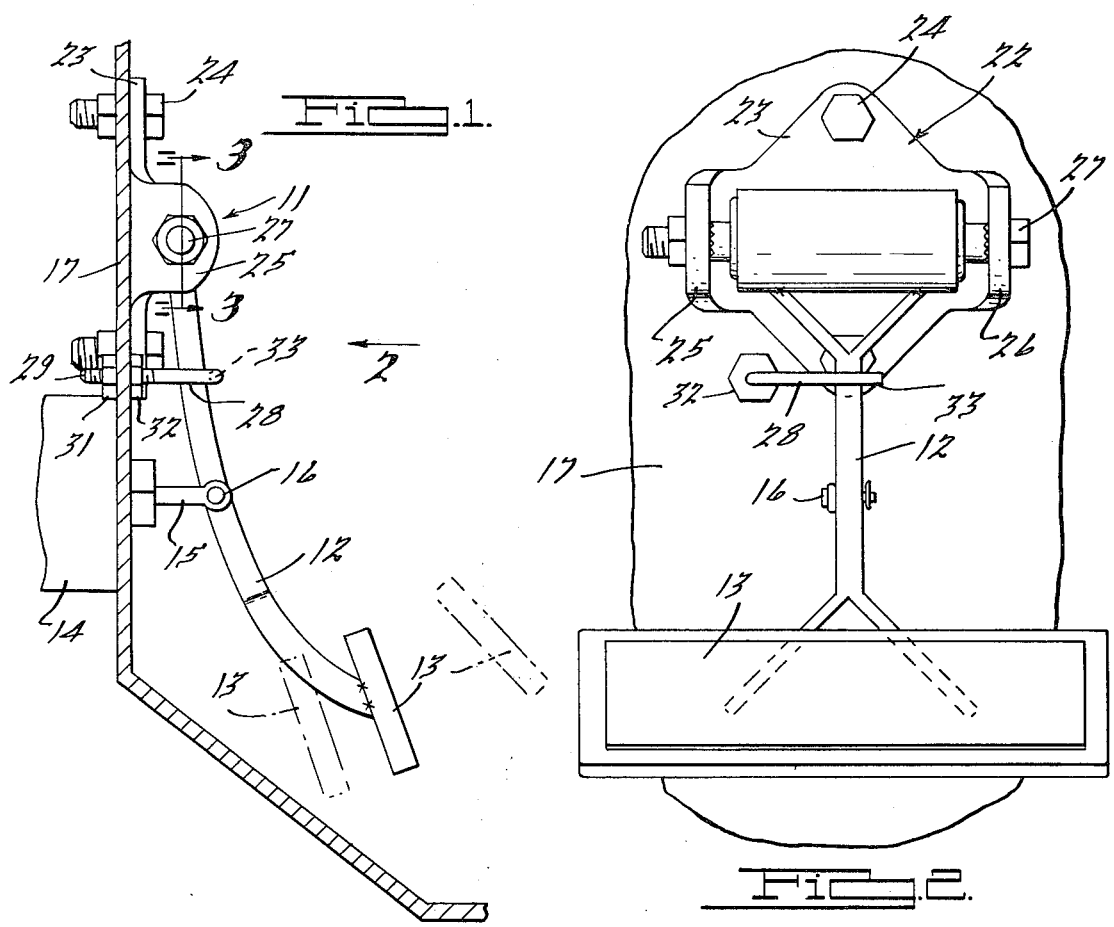
FIG. 1.
FIG. 2.
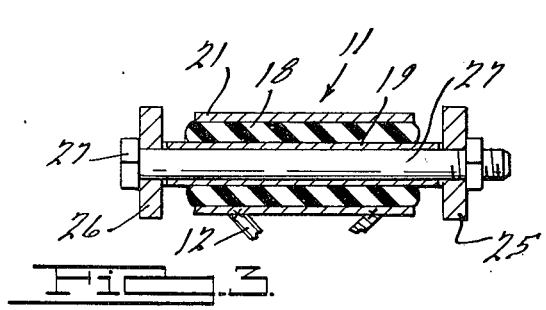
FIG. 3.
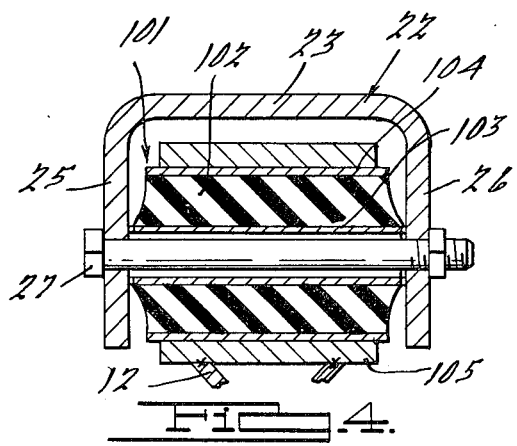
FIG. 4.

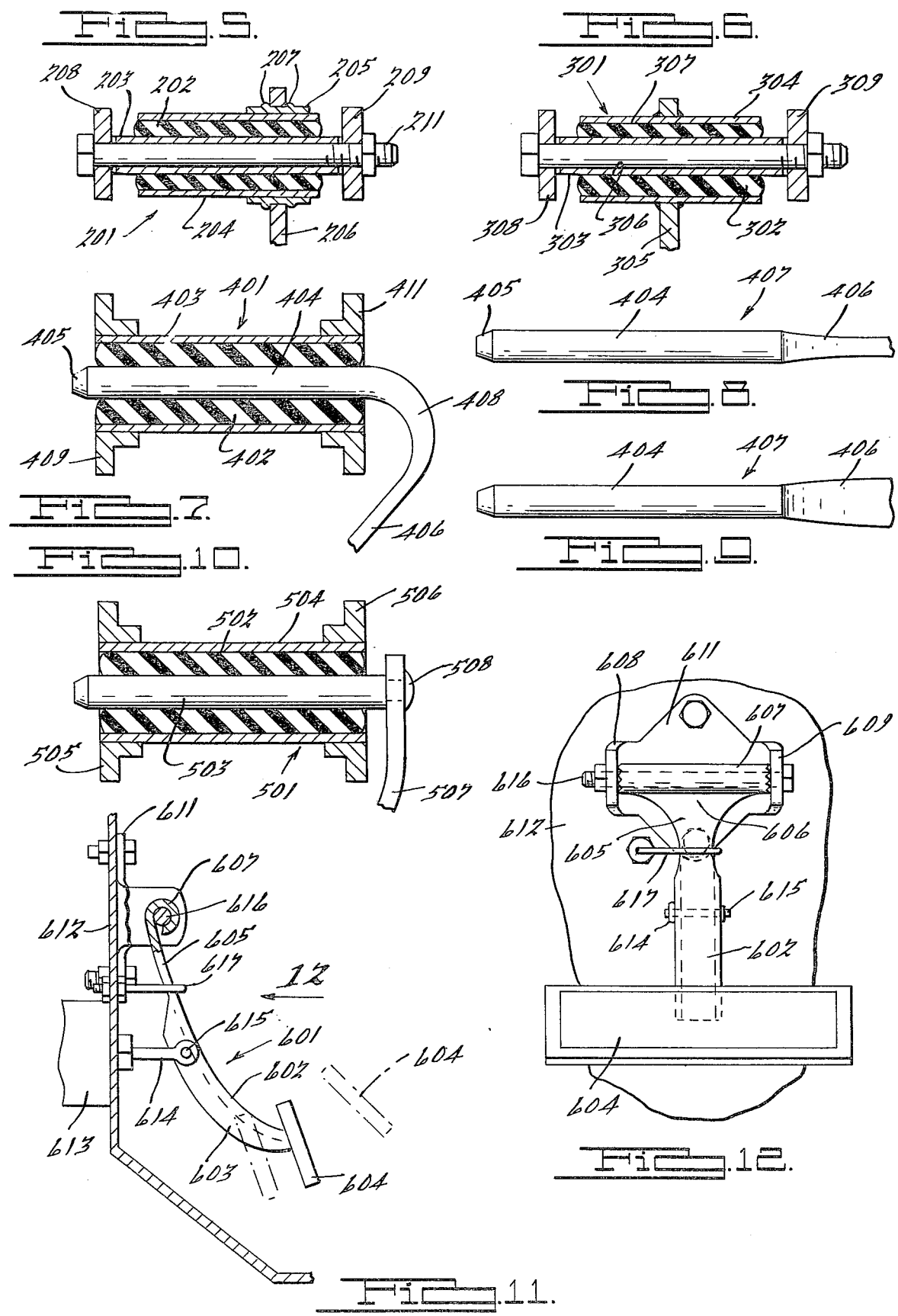

RESILIENT LEVER ASSEMBLY

This application is a continuation-in-part of application Ser. No. 693,104, filed June 4, 1976 by the present applicant and entitled "Combined Pivot and Spring Mounting for Lever now abandoned."

BACKGROUND OF THE INVENTION

1. Field of the Invention

The invention relates to mountings for levers, and particularly, to lever mountings where it is desired to provide a spring action which constantly urges the lever in one direction against resistance means such as a stop An example of such an assembly is a lever which supports an automotive brake pedal beneath the dashboard and adjacent the firewall. In small cars, especially those with front wheel drive, there is limited space for mounting a spring which will return the brake pedal to its upper position. Other areas of application for the invention could be pivoted handles or doors.

2. Description of the Prior Art

It is known to mount levers, handles, doors or the like on hinges and at the same time provide separate spring means urging the part in one direction against a stop. For example, in the case of a brake pedal it is known to provide a helical spring in addition to the pivot. However, compact cars, especially those which have front wheel drives and transaxles, have tight quarters under the dashboard which make it difficult to install the conventional parts used for this purpose.

Other patents discovered during the search which disclose bushings of the same general construction that are used as mounts for suspensions are Hipsher No. 3,584,857 which uses the bushing to support a leaf spring and Herold No. 2,087,254 which relates to a tilting mechanism for chairs.

BRIEF SUMMARY OF THE INVENTION

It is an object of the present invention to provide an improved construction for both mounting and spring-urging levers which eliminates the need for a separate spring, thus making it easier to install items such as brake pedal assemblies in small cars.

It is another object to provide an improved combined spring and mounting of this nature which is sturdy, reliable, compact and inexpensive to fabricate.

It is a further object to provide a novel and improved resilient lever assembly of this nature which, when applied to brake pedals, enhances the uniformity of the brake pedal "feel" from car to car during mass production, regardless of tolerance differences between vehicles.

It is also an object to provide an improved resilient lever assembly of this character in which the preloading may be negative as well as positive, positive preloading returning the lever to its original position while negative preloading is useful, for example, in holding a push rod against the valving of a vehicle brake booster, thus eliminating "lost motion" of the pedal as well as a "hump" in initial pedal movement.

It is another object, in one form of the invention, to provide an improved resilient lever assembly which automatically adjusts for loss of pedal height upon brake application in an automotive vehicle.

It is a further object, in another form of the invention, to provide an improved resilient lever assembly of this character having a minimum of parts which need to be assembled.

It is also an object, in still another form of the invention, to provide an improved resilient lever assembly of this nature which eliminates the need for persons experienced in metalworking to handle rubber parts with which they may not be familiar.

It is another object to provide a novel and improved resilient lever assembly of this character which minimizes the possibility of error when the unit is finally assembled in a vehicle or the like by ensuring that improper installation will be immediately noticeable.

Briefly, the invention comprises a resilient lever assembly having a rigid lever and a resilient support at one end thereof, lever movement resistance means connected to said lever and resisting movement thereof in one direction, a fixed member, and means securing said resilient support to said fixed member in a rotational position such that said support will be stressed in a direction constantly urging the lever against said lever movement resistance means.

BRIEF DESCRIPTION OF THE DRAWINGS

FIG. 1 is a side elevational view of a brake pedal for a car showing the manner in which the combined spring and pivot of one version of this invention is secured to the firewall of the car;

FIG. 2 is a rear elevational view taken in the direction of the arrow 2 of FIG. 1 and showing the mounting for the inner sleeve;

FIG. 3 is a fragmentary cross-sectional view taken along the line 3—3 of FIG. 1 and showing the construction of the bushing and sleeve;

FIG. 4 is a view similar to FIG. 3 but showing a modified form of the invention;

FIG. 5 is a view similar to FIGS. 3 and 4 but showing another modified form of the invention which permits persons experienced only in metalworking to avoid the necessity of handling the rubber bushing;

FIG. 6 is a view similar to FIGS. 3, 4 and 5 but showing a further modification of the invention in which rubber bushing is so shaped as to automatically adjust for loss of pedal height upon brake application;

FIG. 7 is a view similar to FIGS. 3, 4, 5 and 6 showing another embodiment of the invention which eliminates the necessity for one of the sleeves between which the rubber bushing is disposed;

FIG. 8 is a fragmentary side elevational view of the lever in the embodiment of FIG. 7;

FIG. 9 is a fragmentary top plan view of this lever;

FIG. 10 is a view similar to FIG. 7 but showing a modified construction for the lever;

FIG. 11 is a view similar to FIG. 1 but showing another embodiment of the invention in which the resilient support comprises an extension of the lever which has spring-like properties; and FIG. 12 is a rear elevational view taken in the direction of the arrow 12 of FIG. 11.

DESCRIPTION OF THE PREFERRED EMBODIMENTS

Referring first to the embodiment of FIGS. 1 to 3, the combined pivot and spring of this invention is generally indicated at 11 and is shown as supporting a lever 12 for a brake pedal 13. The brake pedal is mounted in an automotive vehicle, and lever 12 is connected to the brake system shown partially at 14 by means of a rod 15 pivoted at 16 to the lever and extending through the firewall 17 of the vehicle. By stepping on the brake pedal, the driver of the car will move it from its solid lines to its dot-dash line position in FIG. 1, operating the brake. When the driver lifts his foot from the pedal, it will return to its solid line position.

Unit 11 comprises an annular cylindrical rubber bushing 18 secured on its inner surface to a sleeve 19 and on its outer surface to a sleeve 21, the latter being fixed to lever 12. Bushing 18 may be frictionally secured to the sleeves, that is, by tight engagement so that little or no slippage can occur between the rubber and metal surfaces. The construction is similar to that shown and described with respect to FIG. 6 of U.S. Pat. No. 3,693,963 issued Sept. 26, 1972. Sleeve 19 is longer than bushing 18 and sleeve 21, and has serrated ends which are stationarily held to prevent sleeve 19 from rotating.

The means for holding sleeve 19 comprises a mounting bracket generally indicated at 22 in FIG. 2. This bracket has a central portion 23 secured by bolts 24 to firewall 17, and a pair of ears 25 and 26 extending rearwardly from the firewall. A bolt 27 passes through apertures in these ears and through sleeve 19, drawing the ears against the serrated sleeve ends to fix the sleeve to the bracket.

Unit 11 is secured to bracket 22 in such a position that, if bushing 18 were to remain unstressed, pedal 13 would be held rearwardly of its normal brake-releasing (solid line) position, for example in the double dot-dash line position of FIG. 1. A stop 28 is provided for holding lever 12 so that brake pedal 13 will be in its normal brake releasing position. This stop is shown as comprising an L-shaped member threaded at one end 29 and secured to firewall 17 by nuts 31 and 32 so that the distance of the hooked end 33 of member 28 with respect to the firewall may be adjusted. End 33 is in obstructing relation with lever 12. When installing the assembly, after unit 11 has been secured in its position, pedal 13 will be depressed from its double dot-dash line to its solid line position, and then stop 28 will be installed to hold the pedal in that position.

In operation of the assembly, bushing 18 will be constantly under torsion between inner sleeve 19 and outer sleeve 21 so as to hold lever 12 against stop 28. At the same time unit 11 will act as a frictionless pivot for lever 12 so that an operator pressing on pedal 13 will be able to actuate brake system 14. During the time that pressure is on pedal 13, bushing 18 will be under increased torsion between its inner and outer surfaces since sleeve 19 will be held stationary while sleeve 21 rotates. When the brake pedal is released, this torsion will tend to rotate sleeve 21 in a direction returning lever 12 against stop portion 33 and thus returning brake pedal 13 to its solid line position.

FIG. 4 shows another form of the combined spring and pivot which is similar to that of the previous embodiment and generally indicated at 101. In this case, the rubber bushing 102 is molded in an annular cylindrical form and bonded to an inner sleeve 103 and an outer sleeve 104. The outer sleeve is fixed, for example by a press fit, to a surrounding sleeve 105 which is secured to brake lever 12. As in the previous embodiment, the inner sleeve 103 is longer than outer sleeve 104 and has serrated ends secured between the ears 25 and 26 of a bracket 22, the ears being held against the serrated end by a bolt 27. The operation of this embodiment will be the same as the previous one, inner sleeve 102 being initially fixed in a position such that bushing 102 will have to be prestressed in order to mount stop 28 in position.

Instead of securing unit 11 to bracket 22 so that the unstressed bushing 18 would hold pedal 13 in the double dot-dash line position of FIG. 1, the unit could be secured so that the unstressed bushing would hold the pedal in the single dot-dash line position. In other words, instead of positive preloading of bushing 18 in FIG. 1 (toward the double dot-dash line position), the preloading may be made negative instead. In this case, instead of the lever movement resistance means comprising stop 33, it would comprise the valving of the brake system 14, and in particular the brake booster valving (not shown), push rod 15 being effectively held against this brake booster valving by the negative preloading. This would eliminate what is commonly referred to as "lost motion" of the brake pedal which is an undesirable phenomenon, and could also eliminate a noticeable resistance to foot pressure when the pedal is first pressed, sometimes referred to as a "hump" in the pedal during its initial movement. Conceivably, the two-stage valve which is conventionally provided in the brake booster, could thus be eliminated or substantially modified to reduce its cost.

FIG. 5 illustrates another embodiment of the invention which is basically similar to that of FIGS. 1-3 but which incorporates a modification enabling persons familiar with metalworking but unfamiliar with handling rubber parts to avoid the necessity of handling the rubber bushing. This embodiment is generally indicated at 201 and comprises an annular cylindrical rubber bushing 202 secured on its inner surface to a sleeve 203 and on its outer surface to a sleeve 204. An additional sleeve 205 surrounds sleeve 204 and is secured thereto by a suitable means such as a press fit. Sleeve 205 may be considerably shorter than sleeve 204 and positioned at a convenient location therealong.

The sub-assembly comprising rubber bushing 202 and sleeves 203 and 204 may be manufactured by persons familiar with handling rubber parts. At another location, the sub-assembly comprising sleeve 205 and brake pedal lever 206 may be manufactured, lever 206 being secured to sleeve 205 by a conventional staking method, as indicated at 207. The sub-assembly comprising sleeve 205 and lever 206 may then be mounted on the outer sleeve 204 of the previously described sub-assembly by pressing sleeve 205 onto sleeve 204. This may be accomplished by persons familiar only with metalworking rather than with rubber parts. The entire assembly may then be secured between the ears 208 and 209 of the bracket by means of bolt 211, in the manner described with respect to FIGS. 1, 2 and 3.

FIG. 6 shows another modification of the invention in which the combined pivot and spring is so constructed as to automatically adjust for loss of pedal height upon application of the brake, or for any other shifting of a lever for which adjustment is desired. The unit is generally indicated at 301 and comprises a rubber bushing 302 secured on its inner surface to a sleeve 303 and on its outer surface to a sleeve 304. A lever 305 such as a brake pedal lever is secured by staking, welding or otherwise to sleeve 304.

Bushing 302 may be molded, extruded or otherwise formed into an annular cylindrical shape, but the inner surface 306 of the bushing is eccentric with respect to the outer surface 307. For use in an installation like that shown in FIGS. 1 and 2, the thinner portion of bushing 302 could be positioned toward the top and the thicker portion toward the bottom when the assembly is installed by securing sleeve 303 to bracket ears 308 and 309 by a bolt 311.

In operation of the embodiment of FIG. 6, as foot pressure is applied to the brake pedal, sleeve 304 will be twisted with respect to sleeve 303 to increase the stress on the rubber bushing. This will tend to equalize the upper and lower thicknesses of the bushing and therefore lift pedal lever 305. Since true pivotal movement of lever 305 (see FIG. 1 with respect to lever 12) would tend to lower pivot 16 of rod 15 and also lower pedal 13, the above-described action of bushing 302 will automatically compensate for loss of the pedal height, and lowering of pivot 16.

FIGS. 7, 8 and 9 show still another embodiment of the invention which incorporates the basic principles thereof, but is less expensive to manufacture than the previous embodiments. The resilient lever assembly is generally indicated at 401 and comprises an annular cylindrical rubber bushing 402 secured on its outer surface to a sleeve 403. The inner surface of the bushing, however, instead of being secured to an inner sleeve, is secured to a rod 404 passing therethrough. This rod is of cylindrical shape, having a tapered end 405 for insertion in the bushing with a press fit. Rod 404 is formed as an extension of a lever 406 which may be a brake pedal lever. A method of forming combined parts 404, 406 is shown in FIGS. 8 and 9. A cylindrical rod generally indicated at 407 having the tapered end 405 is coined, but is, flattened, except in the area which will form extension 404. The flattened part forms lever 406 and the juncture 408 of these two parts is bent as shown in FIG. 7. Outer sleeve 403 may be secured to the ears 409 and 411 of a fixed bracket by a press fit or other appropriate means.

In use of the embodiment of FIGS. 7, 8 and 9, sleeve 403 will be mounted in bracket ears 409, 411 in a rotational position such that bushing 402 will be stressed in a direction constantly urging lever 406 against the lever movement resistance means discussed with respect to the embodiment of FIGS. 1, 2 and 3. It will be noted that in this case, as contrasted with the previously described embodiments, the lever is connected to the inner cylindrical elongated member and the outer member is stationarily secured.

FIG. 10 shows an embodiment similar to that of FIGS. 7, 8 and 9 and is generally indicated at 501. In this case, the rubber bushing 502 is secured on its inner surface to a rod 503 and on its outer surface to a sleeve 504 which is fixed to ears 505 and 506 of the stationary bracket. Rod 503 is not integral with lever 507 as in the previous embodiment but is a separate member which is secured thereto by staking, welding, or other appropriate means adjacent its head 508. Lever 507 is bent in an appropriate manner to support a brake pedal or the like at its lower end.

FIGS. 11 and 12 show still another embodiment of the invention in which the resilient support, instead of comprising a rubber bushing, comprises an elongated member having spring-like qualities which is secured to one end of the lever. The resilient lever assembly is generally indicated at 601 and comprises a lever 602 in the form of a channel-shaped member with flanges 603 for strengthening purposes, and a pedal 604 secured to its lower end. A resilient support in the form of an extension 605 of lever 602 is formed at the upper end of the lever. As shown, the lever and its extension are integral with each other, portion 605 being heat treated and tempered to achieve the spring-like properties. Portion 605 is also necked or otherwise shaped to obtain desired flexibility. The upper end is flared as indicated at 606 and terminates in a tubular or cylindrical portion 607. The length of this tubular portion is such that it may be disposed between and secured to the ears 608 and 609 of a bracket 611 which is secured to the firewall 612 of the vehicle. The brake system is shown partially at 613 and lever 602 is connected thereto by a rod 614 pivoted at 615 to the lever and extending through firewall 612.

Unit 601 is secured to bracket 611 by a bolt 616 in such a position that, if spring-like portion 605 were to remain unstressed, pedal 604 would be held rearwardly of its normal brake-releasing (solid line) position, for example, in the double dot-dash line position of FIG. 11. A stop 617 is provided for holding lever 602 so that brake pedal 604 will be in its normal brake releasing position. Instead of this positive preloading, the loading could be negative as described previously.

In operation of the assembly shown in FIGS. 11 and 12, spring-like extension 605 will be constantly under bending stress so as to hold lever 602 against stop 617. At the same time, portion 605 will act as a frictionless support for lever 602 so that an operator pressing on pedal 604 will be able to actuate brake system 613. During the time that pressure is on pedal 604, extension 605 will be under increased stress while sleeve 607 is held stationary. When the brake pedal is released, this stress will tend to return lever 602 in a direction against stop 617, thus returning brake pedal 604 to its solid line position.

While it will be apparent tha the preferred embodiments of the invention disclosed are well calculated to fulfill the objects above stated, it will be appreciated that the invention is susceptible to modification, variation and change without departing from the proper scope or fair meaning of the subjoined claims.

I claim:

1. A rigid elongated automotive brake pedal lever or the like mounted on a vehicle having a firewall between the engine and passenger compartment, said lever comprising a sleeve fixed to one end, a second sleeve within the first sleeve and spaced inwardly therefrom, a rubber bushing disposed between the two sleeves and secured thereto, means stationarily securing the inner sleeve comprising bracket means having a portion secured to the vehicle firewall and ears secured to the opposite ends of said inner sleeve, said lever depending downwardly from said bracket, a stop adjacent the lever, and means holding the stop in a position such that the rubber bushing will be stressed in a direction constantly urging the lever against the stop.

2. The combination according to claim 1, further provided with means for adjusting said stop so as to preselect the released position of said automotive pedal.

3. The combination according to claim 2, said stop comprising a hooked lever, said stop adjusting means comprising a threaded portion on said lever extending through the vehicle firewall and secured thereto.

4. The combination according to claim 1, said stop being directly engageable by said lever.

5. The combination according to claim 4, said stop being engageable by an intermediate portion of said lever.

6. The combination according to claim 1, said bracket means comprising a U-shaped bracket.

* * * * *